(12) United States Patent
Jeong

(10) Patent No.: US 11,247,303 B2
(45) Date of Patent: Feb. 15, 2022

(54) HORIZONTAL MULTI-SPINDLE MACHINING CENTER

(71) Applicant: SUNGRIM ENGINEERING CO., LTD, Changwon-si (KR)

(72) Inventor: Sung Il Jeong, Changwon-si (KR)

(73) Assignee: SUNGRIM ENGINEERING CO., LTD, Changwon-si (KR)

( * ) Notice: Subject to any disclaimer, the term of this patent is extended or adjusted under 35 U.S.C. 154(b) by 146 days.

(21) Appl. No.: 16/637,147

(22) PCT Filed: Aug. 20, 2019

(86) PCT No.: PCT/KR2019/010580
§ 371 (c)(1),
(2) Date: Feb. 6, 2020

(87) PCT Pub. No.: WO2020/050523
PCT Pub. Date: Mar. 12, 2020

(65) Prior Publication Data
US 2021/0060666 A1    Mar. 4, 2021

(30) Foreign Application Priority Data
Sep. 3, 2018 (KR) .................. 10-2018-0104468

(51) Int. Cl.
*B23Q 3/157* (2006.01)
*B23C 1/04* (2006.01)
(Continued)

(52) U.S. Cl.
CPC ............ *B23Q 3/15786* (2013.01); *B23C 1/04* (2013.01); *B23Q 1/626* (2013.01);
(Continued)

(58) Field of Classification Search
CPC .. B23C 1/04; B23C 1/045; B23C 1/08; B23C 1/10; B23Q 2039/006; B23Q 39/022;
(Continued)

(56) References Cited

U.S. PATENT DOCUMENTS 4,249,243 A * 2/1981 Yoshida ............. B23Q 3/15539
700/175
7,189,194 B1 * 3/2007 Takayama .............. B23Q 1/626
408/234

(Continued)

FOREIGN PATENT DOCUMENTS

CN        103213034 A      7/2013
CN        107297641 A      10/2017
(Continued)

OTHER PUBLICATIONS

Machine Translation of DE 102018104028, which DE '028 was published Aug. 2018.*

(Continued)

*Primary Examiner* — Erica E Cadugan
(74) *Attorney, Agent, or Firm* — Novick, Kim & Lee, PLLC; Jae Youn Kim

(57) ABSTRACT

The present invention relates to a machining center, and more specifically to a horizontal multi-spindle machining center, in which 2-axis (Y- and Z-axis) or 3-axis (X-, Y- and Z-axis) transfer drive units are disposed in the machining center installed to machine workpieces, in which a ram equipped with spindles is moved in the up-down, front-back, and/or left-right directions of the workpieces, in which the spindles are configured to include a plurality of spindles, i.e., 2 to 8 spindles, so that a plurality of workpieces may be machined simultaneously, and in which tool change is simultaneously performed for tools fastened to the plurality of spindles and configured to machine workpieces by using an auto tool changer (ATC), so that tool change speed may (Continued)

be improved and thus manufacturing efficiency may be improved.

5 Claims, 16 Drawing Sheets

(51) Int. Cl.
  *B23Q 5/28* (2006.01)
  *B23Q 1/62* (2006.01)
  *B23Q 17/00* (2006.01)
  *B23Q 39/02* (2006.01)
  *B23Q 39/04* (2006.01)
  *B23Q 3/155* (2006.01)
  *B23Q 17/09* (2006.01)
  *B23Q 39/00* (2006.01)

(52) U.S. Cl.
  CPC ...... *B23Q 3/15534* (2016.11); *B23Q 3/15553* (2013.01); *B23Q 5/28* (2013.01); *B23Q 17/0961* (2013.01); *B23Q 39/022* (2013.01); *B23Q 39/042* (2013.01); *B23C 2260/04* (2013.01); *B23Q 3/15722* (2016.11); *B23Q 2039/006* (2013.01); *Y10T 409/307168* (2015.01); *Y10T 409/309576* (2015.01); *Y10T 483/1795* (2015.01); *Y10T 483/1882* (2015.01)

(58) Field of Classification Search
  CPC ............... B23Q 39/023; B23Q 39/024; B23Q 3/15786; B23Q 3/15793; B23Q 17/0961; B23Q 15/22–24; B23Q 15/013; B23Q 5/36; B23Q 5/22–52; Y10T 408/36–385; Y10T 409/307168; Y10T 409/307784; Y10T 409/308344; Y10T 409/308568; B24B 27/0023; B23G 1/20; B23G 1/205; B23B 39/16–24
  USPC .............. 408/31–53; 409/192, 203, 213, 217
  See application file for complete search history.

(56) References Cited

U.S. PATENT DOCUMENTS

| | | | |
|---|---|---|---|
| 7,404,786 B2 * | 7/2008 | Krosta | B23Q 3/15536 483/1 |
| 8,409,062 B2 * | 4/2013 | Benz | B23Q 39/028 483/37 |
| 2006/0188352 A1 * | 8/2006 | Krosta | B23Q 39/024 409/203 |
| 2016/0167182 A1 | 6/2016 | Seo et al. | |
| 2016/0193669 A1 * | 7/2016 | Chen | B23Q 39/023 409/203 |
| 2017/0008139 A1 | 1/2017 | Masayoshi et al. | |
| 2018/0079044 A1 * | 3/2018 | Mototani | B23Q 5/34 |

FOREIGN PATENT DOCUMENTS

| | | |
|---|---|---|
| CN | 107405748 A | 11/2017 |
| DE | 102012015384 A1 * | 2/2014 |
| DE | 102015118672 A1 * | 5/2017 |
| DE | 102018104028 A1 * | 8/2018 |
| FR | 2767729 A1 * | 5/1999 |
| GB | 2167325 A * | 5/1986 |
| JP | 59-069242 A * | 4/1984 |
| JP | 62-218008 A * | 9/1987 |
| JP | 11-138375 A | 5/1999 |
| JP | 2018-118328 A | 8/2018 |
| KR | 10-2013-0119292 A | 10/2013 |
| KR | 10-1630144 B1 | 6/2016 |
| KR | 10-2017-0110643 A | 10/2017 |
| WO | WO 2018/033604 A1 * | 2/2018 |

OTHER PUBLICATIONS

Machine Translation of WO 2018/033604, which WO '604 was published Feb. 2018.*

* cited by examiner

Horizontal Multi-Spindle Machining Center Wherein the Spindles Perform Machining While Being Rotated By Servomotors, Each of the Servomotors Drives A Respective One of the Spindles so that Four Servomotors Configured to Rotate a Total of Four Spindles Are Provided; the Four Servomotors Measure Loads Applied to the Respective Servomotors, Compare the Measured Loads With Each Other, and Stop Operation of the Machining Center When a Different Between Two of the Measured Loads Exceeds A Set Range

FIG. 16

HORIZONTAL MULTI-SPINDLE MACHINING CENTER

TECHNICAL FIELD

The present invention relates to a machining center, and more specifically to a horizontal multi-spindle machining center, in which 2-axis (Y- and Z-axis) or 3-axis (X-, Y- and Z-axis) transfer drive units are disposed in the machining center installed to machine workpieces, in which a ram equipped with spindles is moved in the up-down, front-back, and/or left-right directions of the workpieces, in which the spindles are configured to include a plurality of spindles, i.e., 2 to 8 spindles, so that a plurality of workpieces may be machined simultaneously, and in which tool change is simultaneously performed for tools fastened to the plurality of spindles and configured to machine workpieces by using an auto tool changer (ATC), so that tool change speed may be improved and thus manufacturing efficiency may be improved.

BACKGROUND ART

Generally, general-purpose machine tools, such as CNC lathes or machining centers (MCTs), machine workpiece by using a single spindle. Accordingly, this increases the time required for machining workpiece, which results in a reduction in manufacturing efficiency.

In order to mitigate this irrationality, dedicated machine tools have been developed and used. Dedicated machine tools are each constructed for the purpose of manufacturing only a single type of products. Accordingly, even when the structure of the products is slightly changed, it is necessary to modify the design of the machine tool. When the structure of the products is significantly changed or another type of products need to be manufactured, it is difficult to use the dedicated machine tool. Therefore, a problem arises in that users are reluctant to use dedicated machine tools despite the improvement of manufacturing efficiency.

Meanwhile, multiple machining centers (particularly, line centers) are often installed due to the advantage in which multiple machining centers may be simultaneously connected and disposed in a manufacturing line and thus a manufacturing process may be configured in a linear form, beyond the concept of the conventional general-purpose machine tools. In this case, such machining centers cannot also overcome the above-described problems of the dedicated machine tools.

As a prior art related to a line center having one spindle, there are a multi-axis vertical machining center equipped with a horizontal auto tool changer and a tool changing method proposed in Korean Patent Application Publication No. 10-2013-0119292.

This patent publication discloses the multi-axis vertical machining center equipped with a horizontal auto tool changer, the multi-axis vertical machining center including a bed, a column disposed over the bed and configured to move forward or backward in the Y-axis direction, a spindle unit disposed on one side of the column and configured to slide up or down in the Z-axis direction and to include a plurality of spindles, and a tool magazine, wherein the tool magazine is disposed on the top of the bed, and the tool magazine is configured such that a plurality of tool grip bars is arranged in rows and columns.

The tool magazine is disposed on the top of the bed, and thus the size of the bed is inevitably increased, thereby making it inconvenient to place workpiece on a workbench on which workpiece is placed. In addition, the overall size of the machining center is increased, and thus it has a large weight and the installation area thereof is increased, thereby causing the problem in which efficient placement on an automation line is difficult.

As another prior art, there is a horizontal multi-axis line center proposed in Korean Patent Application No. 10-1630144 filed and registered by the present applicant.

This patent application discloses a line center for machining workpiece, the line center including a base 10 configured to be disposed on a support surface, a column 30 disposed over the base 10, a tool post 40 configured to be moved along with the column 30, and spindles 41 configured to be mounted into the tool post 40 and to be coupled to chucks 42, to which cutting tools 1 are fastened, at first ends thereof, wherein the spindles 41 are disposed in a direction parallel to a surface on which the base 10 is disposed, include at least two or more spindles, and machine workpieces simultaneously by using two or more tools, the spindles 41 are disposed in the upper portion of the column 30, tool change is performed by the circular tool magazine 60, a number of cutting tools equal to the number of spindles 41 are divided for sectors S1 to S4, and tools to be changed with are located in front of the spindles 41 by the rotation of the tool magazine 60. When the tools to be changed with are located in front of the spindles 41 by the rotation of the tool magazine 60, the spindles 41 are moved in the z-axis direction in the state in which there are no tools in the chucks 42 of the spindles 41. Thereafter, the spindles 41 are moved backward in the z-axis direction, are moved downward in the y-axis direction, and are moved forward in the z-axis direction, and perform the machining of workpiece. After the machining of workpiece has been completed, the cutting tools 1 fastened to the chucks 42 of the spindles 41 are put into the tool grip bars 61 by the movement of the spindles 41. A tool magazine body 76 in which the tool magazine 60 and a tool magazine rotating shaft 70 are combined with each other may be moved in the z-axis direction by a cylinder 77, and thus tool change may be easily performed even when the lengths of tools are relatively long. In order to check whether or not the tool magazine 60 is located at an accurate location after the tool magazine 60 has been rotated to perform tool change, a number of measuring grooves equal to the number of sectors are formed in the tool magazine 60 and a sensor is disposed on one side. A safety device is provided such that tool change can be performed by moving the column 30 only after it has been determined that the tool magazine 60 is placed at a predetermined location through the measurement of the sensor. A z-axis motor is provided on the base and the column and components coupled to the column are all transferred, and thus a large amount of driving force is required. Simultaneous tool change using a tool magazine is used, and thus the tool magazine is rotated in the state in which cutting tools used are inserted into empty positions of the tool magazine and then new tools are mounted. Therefore, a loss of time occurs while the tool magazine is being rotated, and the number and types of mountable tools are limited due to the structural limitations of the tool magazine.

DISCLOSURE

Technical Problem

Therefore, an object of the present invention is to provide a horizontal multi-spindle machining center, in which 2- or 3-axis transfer drive units are disposed in the machining center installed to machine workpieces, a ram equipped with spindles is moved in the up-down, front-back, and/or left-right directions of the workpieces, and synchronous control is performed between the drive units, so that the paths of movement of the spindles are minimized and thus power consumption attributable to the movement of the spindles may be reduced, in which the spindles are configured to include a plurality of spindles, so that a plurality of workpieces may be machined simultaneously, and in which tool change is simultaneously performed for tools fastened to the plurality of spindles and configured to machine workpieces by using an ATC, so that tool change speed may be improved and thus manufacturing efficiency may be improved.

Another object of the present invention is to provide a horizontal multi-spindle machining center, in which a number of tool grippers equal to twice the number of spindles are disposed on each side of the tool magazine of an ATC and thus the number of tools disposed on each side of the tool magazine is made equal to twice the number of spindles, so that two types of machining may be continuously performed without rotating the tool magazine and thus tool change time may be shortened, thereby reducing the time for which the workpieces are not machined, and so that a number of various tools equal to twice the number of tools of the conventional tool magazine may be mounted and thus various types of machining may be flexibly dealt with.

Still another object of the present invention is to provide a horizontal multi-spindle machining center, in which Y-axis drive motors constituting part of the Y-axis drive unit are disposed on both sides of a saddle and the two Y-axis drive motors are synchronously controlled, so that the stable movement of the saddle may be ensured and a high machining load may be withstood.

Still another object of the present invention is to provide a horizontal multi-spindle machining center, in which three types of jigs, i.e., an A-axis rotary type of jig, a B-axis rotary type of jig and an A- and B-axis simultaneous rotary type of jig, are selectively used as a jig disposed in the front side of the machining center and configured to fasten workpieces depending on workpieces, and thus the applicability of the machining of workpieces is improved.

Technical Solution

According to the present invention, there is provided a horizontal multi-spindle machining center for machining workpieces, the horizontal multi-spindle machining center including: a base (1) configured to be fastened to a support surface; a column (2) configured to be disposed over the base (1) and to be moved in the left-right direction of workpieces by an X-axis drive unit (10); a ram (3) configured to be disposed in the column (2) and to support spindles (4) into which cutting tools (8) are mounted; a Y-axis drive unit (20) configured to move a saddle (9) supporting the ram (3) in the up-down direction of the workpieces (W); a Z-axis drive unit (30) configured to move the ram (3) in the front-back direction of the workpieces; servomotors (5) configured to rotate the spindles (4); and a jig (40) configured to be disposed in front of the spindles (4) and to fasten the workpieces (W); wherein an ATC (50) configured to allow cutting tools to be mounted is disposed above the spindles.

Advantageous Effects

The horizontal multi-spindle machining center according to the present invention provides: a prominent effect in that the 2- or 3-axis transfer drive units are disposed in the machining center installed to machine workpieces, the ram equipped with the spindles is moved in the up-down, front-back, and/or left-right directions of the workpieces, and synchronous control is performed between the drive units, so that the paths of movement of the spindles are minimized and thus power consumption attributable to the movement of the spindles may be reduced, in that the spindles are configured to include a plurality of spindles, so that a plurality of workpieces may be machined simultaneously, and in that tool change is simultaneously performed for the tools fastened to the plurality of spindles and configured to machine workpieces by using the ATC, so that tool change speed may be improved and thus manufacturing efficiency may be improved; a prominent effect in that a number of tool grippers equal to twice the number of spindles are disposed on each side of the tool magazine of the ATC and thus the number of tools disposed on each side of the tool magazine is made equal to twice the number of spindles, so that two types of machining may be continuously performed without rotating the tool magazine and thus tool change time may be shortened, thereby reducing the time for which the workpieces are not machined, and so that a number of various tools equal to twice the number of tools of the conventional tool magazine may be mounted and thus various types of machining may be flexibly dealt with; and a prominent effect in that the Y-axis drive motors constituting part of the Y-axis drive unit are disposed on both sides of the saddle and the two Y-axis drive motors are synchronously controlled, so that the stable movement of the saddle may be ensured and a high machining load may be withstood, and in that the three types of jigs, i.e., the A-axis rotary type of jig, the B-axis rotary type of jig and the A- and B-axis simultaneous rotary type of jig, are selectively used as the jig disposed in the front side of the machining center and configured to fasten the workpieces depending on workpieces, and thus the applicability of the machining of workpieces is improved.

DESCRIPTION OF DRAWINGS

FIG. 16 schematically shows another embodiment according to the present invention.

BEST MODE

The present invention relates to a machining center, and more specifically to a horizontal multi-spindle machining center, in which 2-axis (Y- and Z-axis) or 3-axis (X-, Y- and Z-axis) transfer drive units are disposed in the machining center installed to machine workpieces, in which a ram equipped with spindles is moved in the up-down, front-back, and/or left-right directions of the workpieces, in which the spindles are configured to include a plurality of spindles, i.e., 2 to 8 spindles, so that a plurality of workpieces may be machined simultaneously, and in which tool change is simultaneously performed for tools fastened to the plurality of spindles and configured to machine workpieces by using an auto tool changer (ATC), so that tool change speed may be improved and thus manufacturing efficiency may be improved.

The X-axis direction defined in the present invention refers to the left-right direction of spindles parallel to the bottom surface of a base, the Y-axis direction refers to the up-down direction of the spindles perpendicular to the bottom surface of the base, and the Z-axis direction refers to the front-back direction of the spindles parallel to the bottom surface of the base.

Furthermore, an A-axis direction is defined as a direction in which rotation is performed using a movement line in the X-axis direction as a central axis, a B-axis direction is defined as a direction in which rotation is performed using a movement line in the Y-axis direction as a central axis, and a C-axis direction is defined as a direction in which rotation is performed using a movement line in the Z-axis direction as a central axis.

Preferred embodiments of the present invention will be described in detail below with reference to the accompanying drawings.

Figure 1:
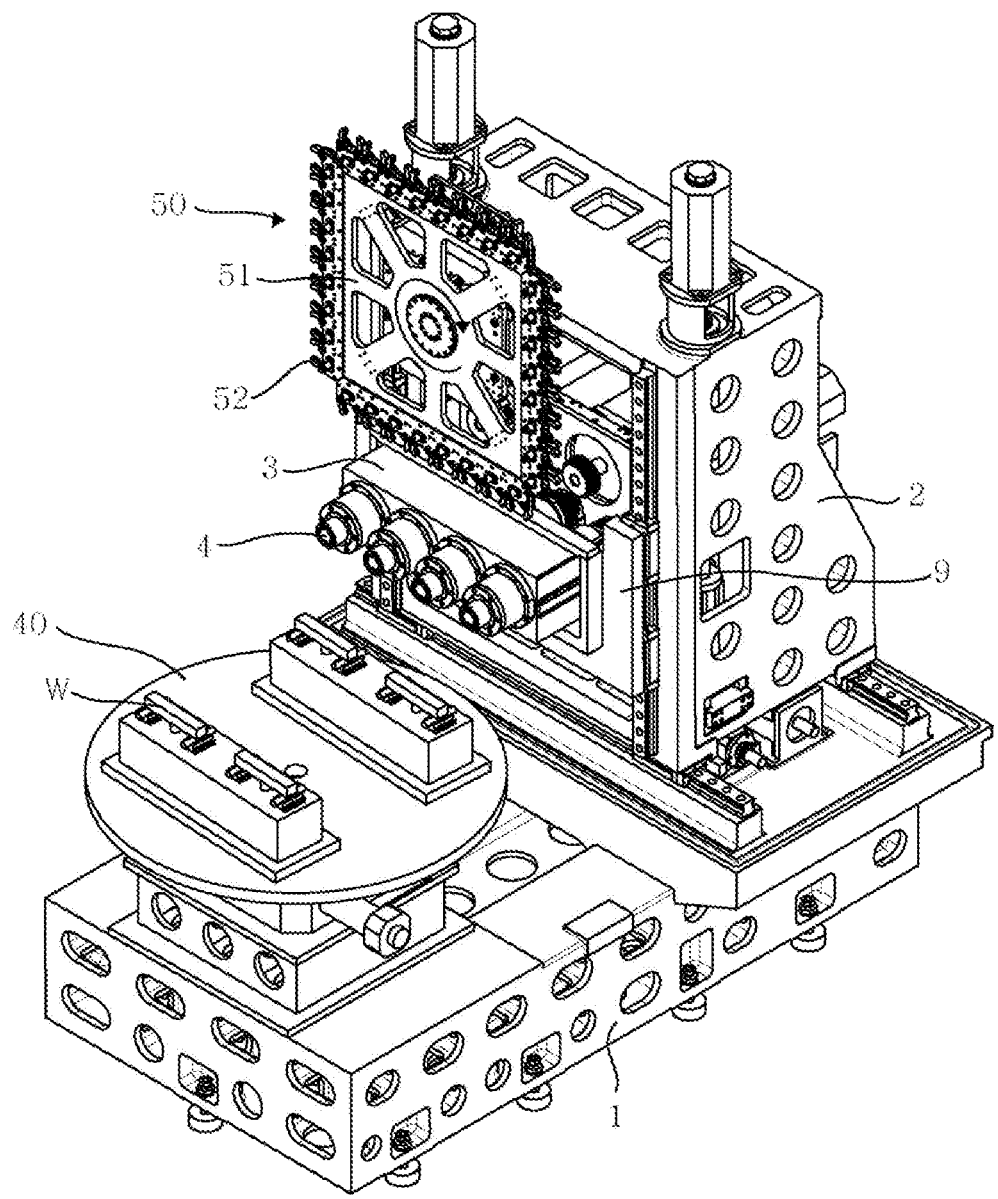
FIG. 1 is a view showing the overall configuration of the present invention.
Figure 2:
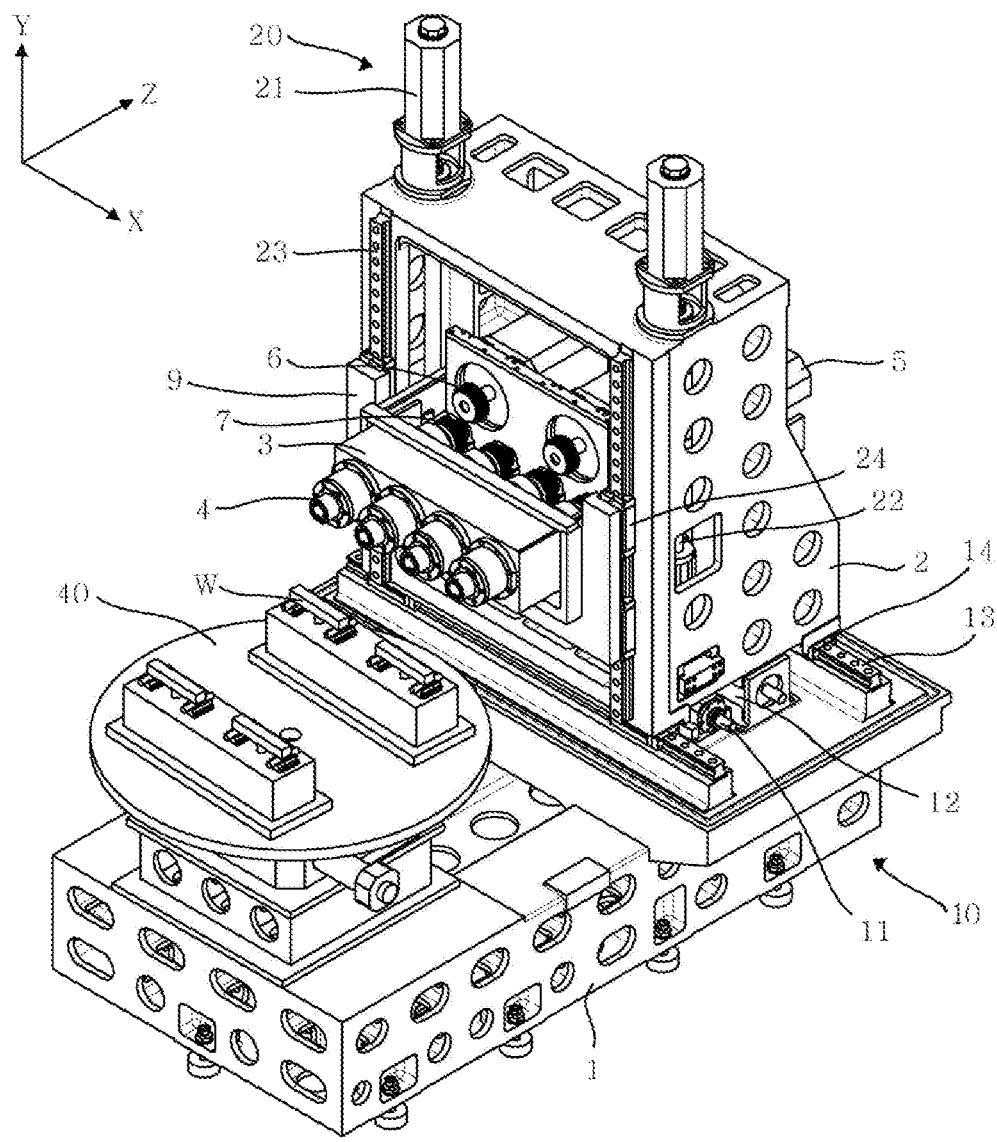
FIG. 2 is a view showing the partial configuration of the present invention.
Figure 3:
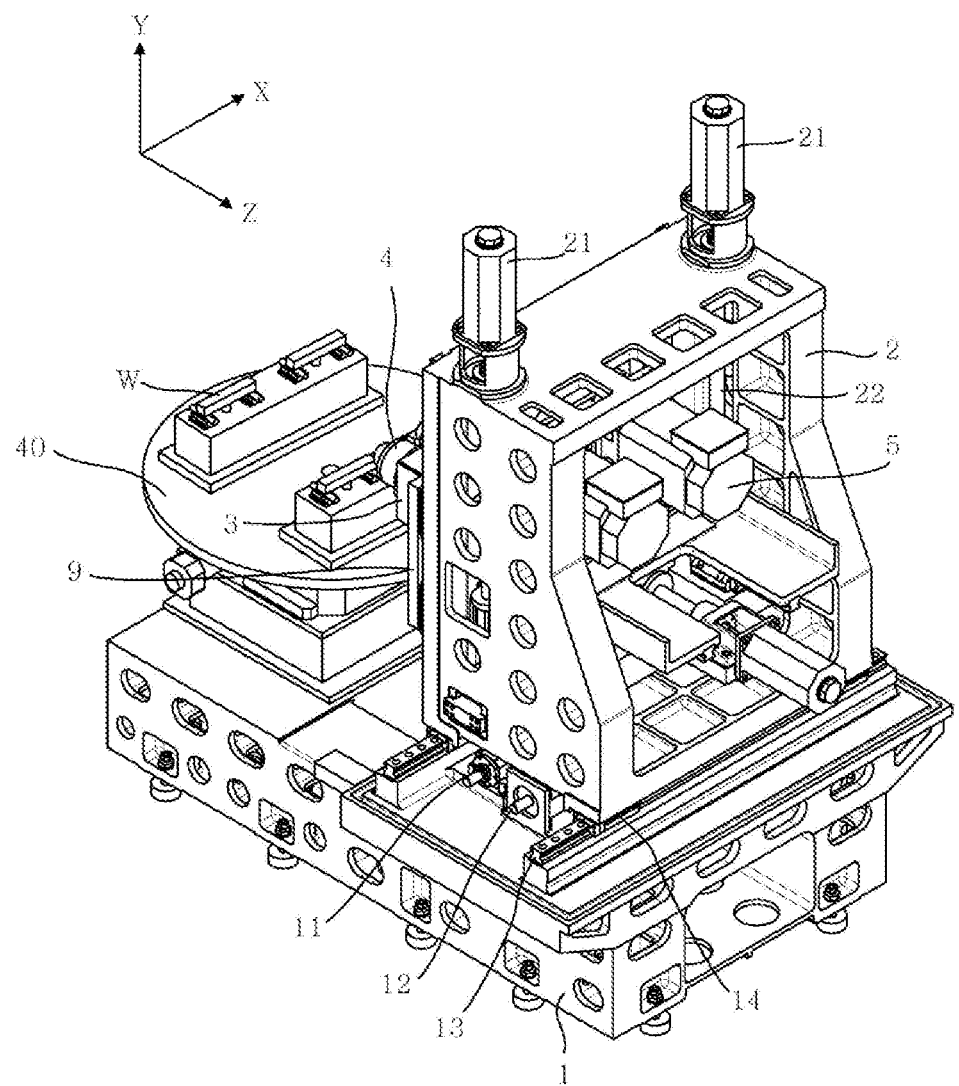
FIG. 3 is a view showing the overall configuration of FIG. 2 when viewed from another point of view.
Figure 4:
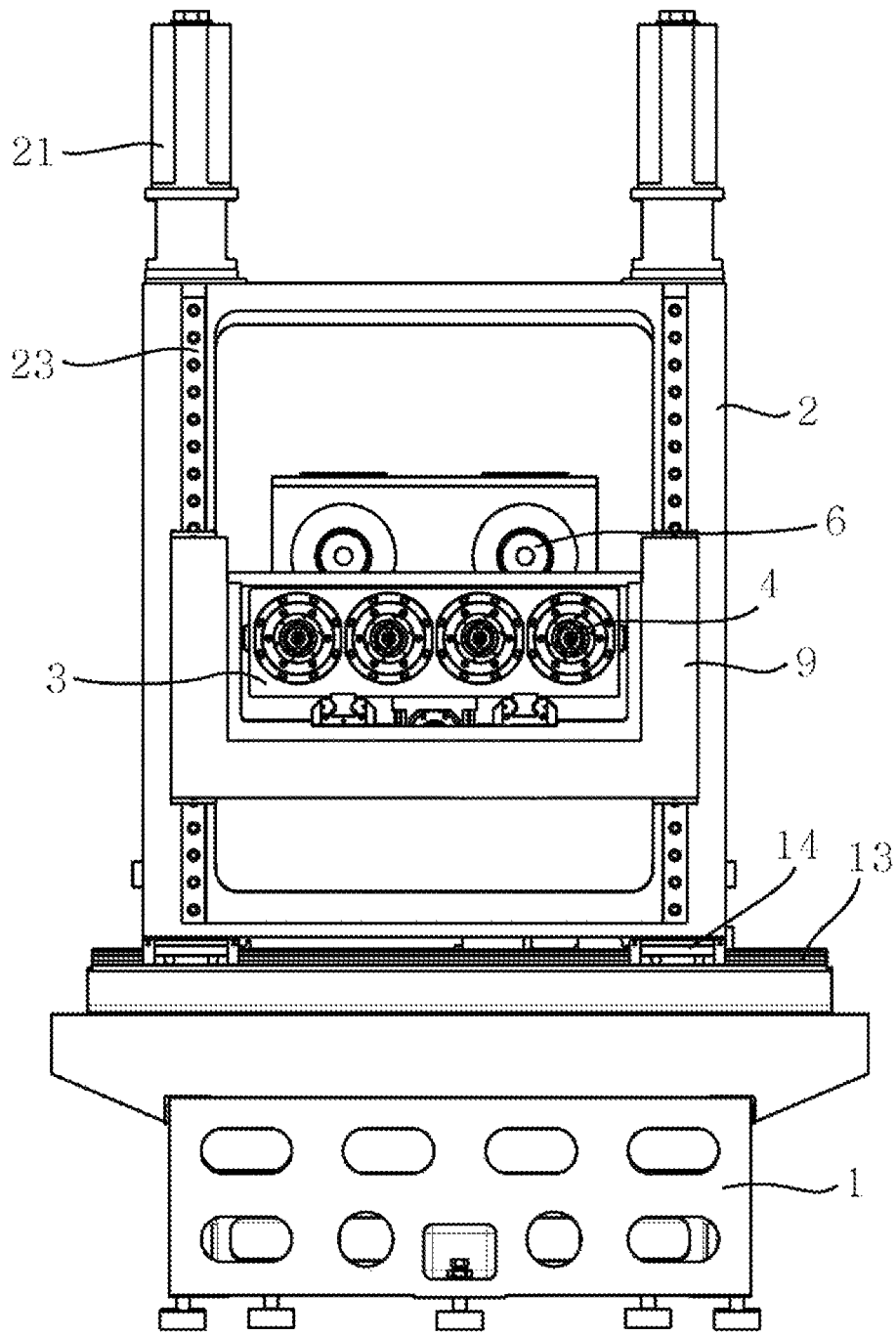
FIG. 4 is a view showing the front configuration of the present invention.
Figure 5:
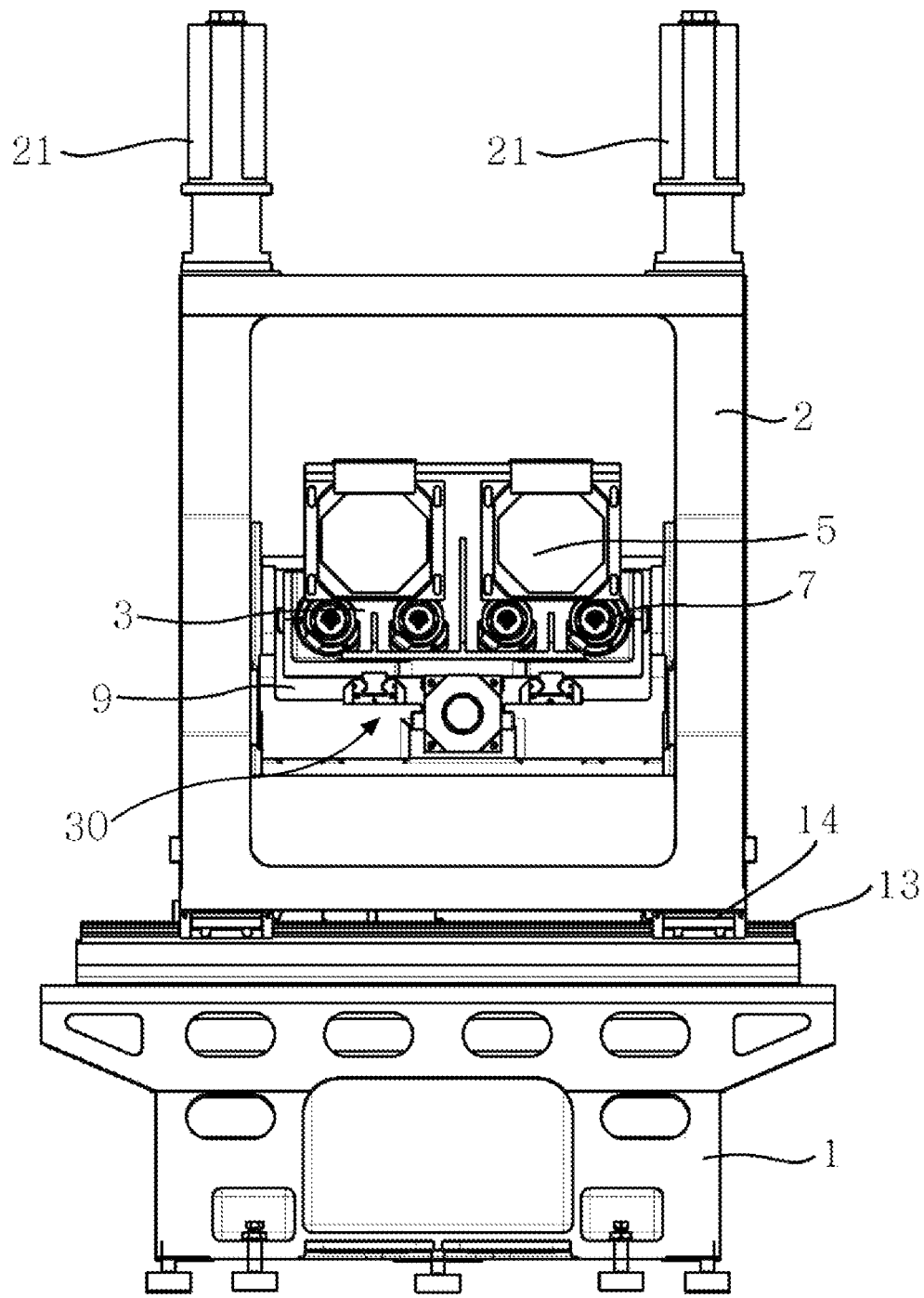
FIG. 5 is a view showing the back configuration of the present invention.
Figure 6:
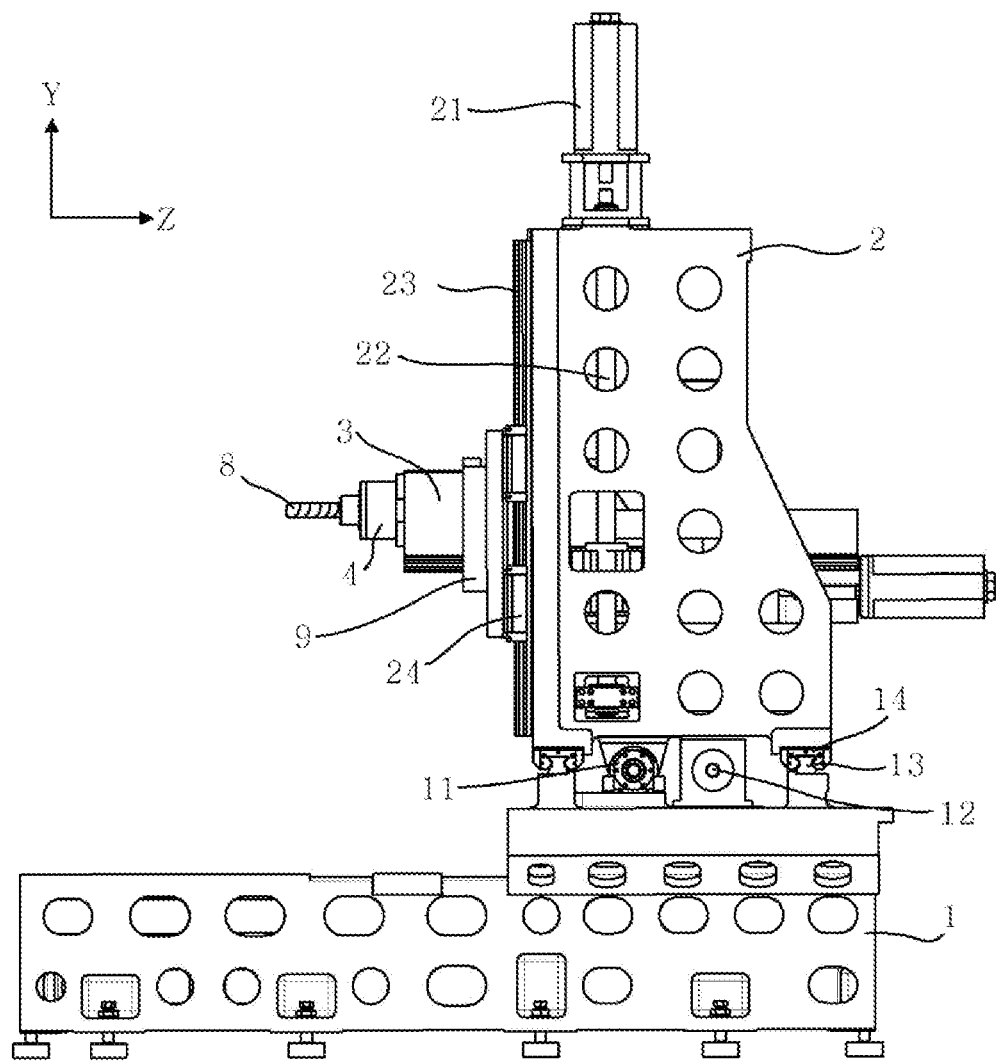
FIG. 6 is a view showing the side configuration of the present invention.

FIG. 1 is a view showing the overall configuration of the present invention, FIG. 2 is a view showing the partial configuration of the present invention, FIG. 3 is a view showing the overall configuration of FIG. 2 when viewed from another point of view, FIG. 4 is a view showing the front configuration of the present invention, FIG. 5 is a view showing the back configuration of the present invention, and FIG. 6 is a view showing the side configuration of the present invention. A horizontal multi-spindle machining center according to the present invention is a machining center for machining a workpiece, the machining center including: a base 1 configured to be fastened to a support surface; a column 2 configured to be disposed over the base 1 and to be moved in the left-right direction of workpieces by an X-axis drive unit 10; a ram 3 configured to be disposed in the column 2 and to support spindles 4 into which cutting tools 8 are mounted; a Y-axis drive unit 20 configured to move a saddle 9 supporting the ram 3 in the up-down direction of the workpieces W; a Z-axis drive unit 30 configured to move the ram 3 in the front-back direction of the workpieces; servomotors 5 configured to rotate the spindles 4; and a jig 40 configured to be disposed in front of the spindles 4 and to fasten the workpieces W; wherein an ATC 50 configured to allow cutting tools to be mounted is disposed above the spindles.

First, the shown machining center is a machining center capable of performing three-axis driving, i.e., X-, Y- and Z-axis driving. In some cases, the machining center may be configured to exclude an X-axis drive unit.

The base 1 is a component configured to be fastened to a support or bottom surface, and corresponds to the bed of a general machine tool. On the top of the base 1, the column 2 having an approximately hexahedral shape with its front and rear surfaces open is disposed to be moved in the left-right direction of the workpieces by the X-axis drive unit 10.

In other words, the X-axis drive unit 10 includes an X-axis drive motor 11, a ball screw 12 configured to be rotated by the X-axis drive motor 11, guide rails 13 configured to be fastened to the top of the base 1, and guide blocks 14 configured to be fastened to the column 2 and to move along the guide rails 13. The ball screw 12 is rotated by the rotation of the X-axis drive motor 11, the guide blocks 14 are moved along the guide rails 13 by the rotation of the ball screw 12, and finally the column 2 is moved.

The Y-axis drive unit 20 configured to move the spindles 4 in the up-down direction of the workpieces W is disposed on one side of the column 2, the Z-axis drive unit 20 configured to move the spindles 4 in the front-back direction of the workpieces is disposed on one side of the Y-axis drive unit 20, the cutting tools 8 configured to machine workpieces, such as drills, reamers, or taps, are mounted onto the spindles 4, and a jig 40 configured to fasten workpieces is disposed in front of the spindles 4.

In the shown embodiment, the guide rails 13 are fastened to the base on the top of the base 1, the column 2 is moved along the guide rails 13, the Y-axis drive unit 20 and the Z-axis drive unit 30 are disposed on one side of the column 2, the ram 3 equipped with the four spindles 4 is disposed in the column 2, the ram 3 is moved with the transfer of the ram 3 in the Z-axis direction being supported by the saddle 9, the column 2, the ram 3 and the saddle 9 are moved in the left-right direction of the workpieces by the X-axis drive unit 10, the ram 3 is moved in the front-back direction of the workpieces by the Z-axis drive unit 30, the ram 3 and the saddle 9 are moved in the up-down direction of the workpieces by the Y-axis drive unit 20, and the ram 3 performs the operations of entering and exiting the column 2 via the Z-axis drive unit 30.

Accordingly, the surface machining of the workpieces may be performed by movement in the X-axis direction, the cutting of the workpieces W such as hole machining may be performed by the rotation of the cutting tool 8 using the rotation direction of the spindles 4, i.e., the Z-axis direction, as a central axis, and the machining of the workpieces, such as the movement in the machined point of the workpiece and tool change, may be performed by the movement in the Y-axis direction.

In addition, the horizontal multi-spindle machining center according to the present invention may withstand a high machining load because it is configured to move the column 2 itself as a component for the movement of the spindles 4 in the X-axis direction, and may minimize the path of movement of the spindles because the X-axis movement, Y-axis movement and Z-axis movement of the spindles are synchronously controlled, thereby reducing the cycle time for machining.

Furthermore, the spindles 4 perform the machining of the workpieces W while being rotated by servomotors 5. As each of the servomotors 5 drives two spindles 4, the machining center is equipped with two servomotors 5 in order to drive a total of four spindles 4.

The servomotors 5 are rotated by applied power and rotate the spindles 4. In the shown form, a motor pulley 6 is disposed on the motor shaft of each of the servomotors 5, a spindle pulley 7 is disposed on one side of each of the spindles 4, and a timing belt is placed around the pulleys on both sides, so that power is transferred via the timing belt.

In other words, the machining center according to the present invention, which is shown in FIGS. 1 to 4, has a total of four spindles 4. In some cases, the machining center may be configured to have two to eight spindles, other than four spindles. It is advantageous that this machining center is close to a dedicated machine tool capable of completing simple machining of specific workpieces within a relatively short period rather than performing various types of complex machining of complex workpieces, unlike general-purpose machine tools such as NC lathes or machining centers. Accordingly, it is advantageous that multiple spindles are provided and multiple products are machined simultaneously. As a result, it may be possible to provide multiple spindles in a single machining center and machine a number of products equal to the number of the spindles at the same time. A single servomotor is responsible for the driving of two spindles, and thus the cost of drive motors may be reduced and the burden of the saddle on driving force may be reduced.

Furthermore, in some cases, there may be employed a method in which one servomotor directly drives one spindle, i.e., a direct drive method. This method is advantageous at high speed. In particular, in the case where products to be cut a lot are machined or in the case where heat is generated on the belt or the like due to power transmission attributable to high-speed rotation, the method in which one spindle is rotated by one servomotor may be employed in order to prevent the above problem.

When the four spindles are driven simultaneously by a single servomotor, a load on the servomotor is increased, and thus the service life of the servomotor may be shortened. When a machining load is relatively high, machining speed is decreased and a cut surface may be rough. Accordingly, it is desirable to apply a method in which the spindles are divided into sets of two spindles and machining force is distributed between them or to apply a direct drive method in which one servomotor rotates one spindle.

Furthermore, the servomotors installed by such a direct drive method may be driven separately when a program is constructed, and can thus be used for machining various types of workpiece such as products requiring only two holes, products requiring only one hole, and products having different distances between holes. Accordingly, this allows for a wider machining range than a typical dedicated machining center. This feature provides the same versatility as a machining center (MCT).

Next, with regard to the Y-axis drive unit, the Y-axis drive unit 20 moves the saddle 9 along the guide rails 23 fastened to the column 2. Two Y-axis drive motors 21 are disposed on both sides of the saddle 9. As the two Y-axis drive motors 21 are synchronously controlled, they move the saddle 9, in which the ram 3 is mounted, in the up-down direction of the workpieces W.

In other words, the guide rails 23 such as LM guides are fastened to the column 2 in the Y-axis direction, the guide blocks 24 such as LM blocks are fastened to the saddle 9 to be moved along the guide rails 23, the Y-axis drive motors 21 and ball screws 22 are formed on both sides of the column 2, and the nuts (housings) of the ball screws 22 are fastened to the saddle 9 and moved by the screws rotated by the Y-axis drive motors 21 in the Y-axis direction, ultimately moving the ram 3 and the saddle 9 in the Y-axis direction.

In this case, the Y-axis drive motors 21 are disposed on both sides of the saddle 9, are synchronously controlled, and move the saddle 9 in the Y-axis direction, thereby more stably supporting the saddle 9. In particular, when the ram 3 in which the spindles 4 are mounted machines workpiece while moving in the Y-axis direction, the force capable of enduring a machining load attributable to machining is increased, and thus the workpiece may be machined within a shorter period of time. Furthermore, vibration attributable to machining is absorbed, and thus a cut surface may be machined more smoothly.

Furthermore, these two Y-axis drive motors 21 may increase the precision of the disposition of the saddle 9 and the stability of the movement of the saddle 9. One of the guide rails 23 may be set as a reference, and the location of the other guide rail 23 may be adjusted according to the guide blocks 24 fastened to the saddle 9. Alternately, when the guide rails 23 are fastened, the locations of the guide blocks 24 may be finely adjusted. By doing so, the convenience and precision of assembly may be ensured. The saddle 9 is moved by the guide blocks 24 guided by the guide rails 23 fastened to the column 2, and thus the path of movement thereof may be precisely formed and rigidity may be ensured, thereby increasing stability.

Furthermore, the two Y-axis drive motors 21 may measure loads applied to the respective drive motors, may compare the measured loads with each other, and may stop the operation of the machining center when the difference between the load of one of the drive motors and the load of the other drive motor exceeds a set range.

In other words, the workpieces W fastened to the jig 40 are normally machined by the cutting tools 8 fastened to the spindles 4 in the same manner. When the same machining is performed, the same machining loads would be applied to both the Y-axis drive motors 21. If the difference between a load applied to one of the Y-axis drive motors and a load applied to the other Y-axis drive motor is larger than a predetermined value, it may be determined that abnormal machining is performed due to damage to the cutting tool or the like. In this case, the occurrence of a defective product may be prevented by stopping the operation of the machining center.

Furthermore, the servomotors 5 used to drive the spindles 4 may also measure loads and use the measured loads to compare a normal machining state and an abnormal machining state.

In other words, the two servomotors 5 may measure loads applied to the respective servomotors 5, may compare the measured loads with each other, and may stop the operation of the machining center when the difference between the load of one of the servomotors and the load of the other servomotor exceeds a set range.

The load values applied to the respective servomotors 5 may be compared with each other by displaying them in real time on an instrument panel for the input of work orders and programs in the machining center. This may be configured to allow the user to immediately check the cutting tools for an abnormality and tool change time.

In the above-described embodiment, the X-axis drive unit 10 and the Y-axis drive unit 20 are illustrated as the guide rails 13 in the form of LM rails and 23 and the guide blocks 14 and 24 in the form of LM blocks. However, in some cases, they may be configured in a box guide-way method for a casting material, i.e., a method in which a frame is configured to be fabricated as a whole, to be then polished, and to be made to come into sliding contact. In the case of the box guide-way method, rigidity enduring a high machining load may be ensured, maintenance is not required even for long-term use, and machining precision may be further increased.

FIGS. 7 to 10 are views showing examples of the configurations of jigs according to the present invention. In the present invention, workpieces are fastened using a jig. The jig 40 may be one of three types of jigs, i.e., an A-axis rotary type of jig 32, a B-axis rotary type of jig 31, and an A- and B-axis simultaneous rotary type of jig 33. Depending on the workpiece, one of the three types of jigs may be selected or may be used in combination.

Figure 7:
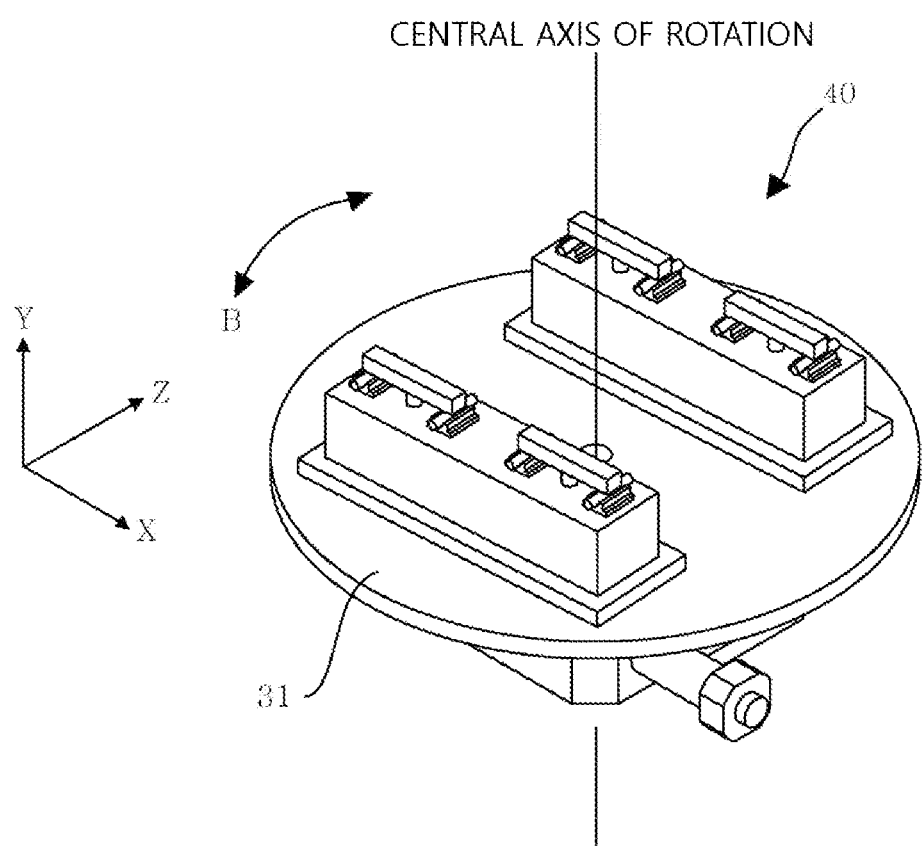
FIGS. 7 to 10 are views showing examples of the configurations of jigs according to the present invention.
Figure 8:
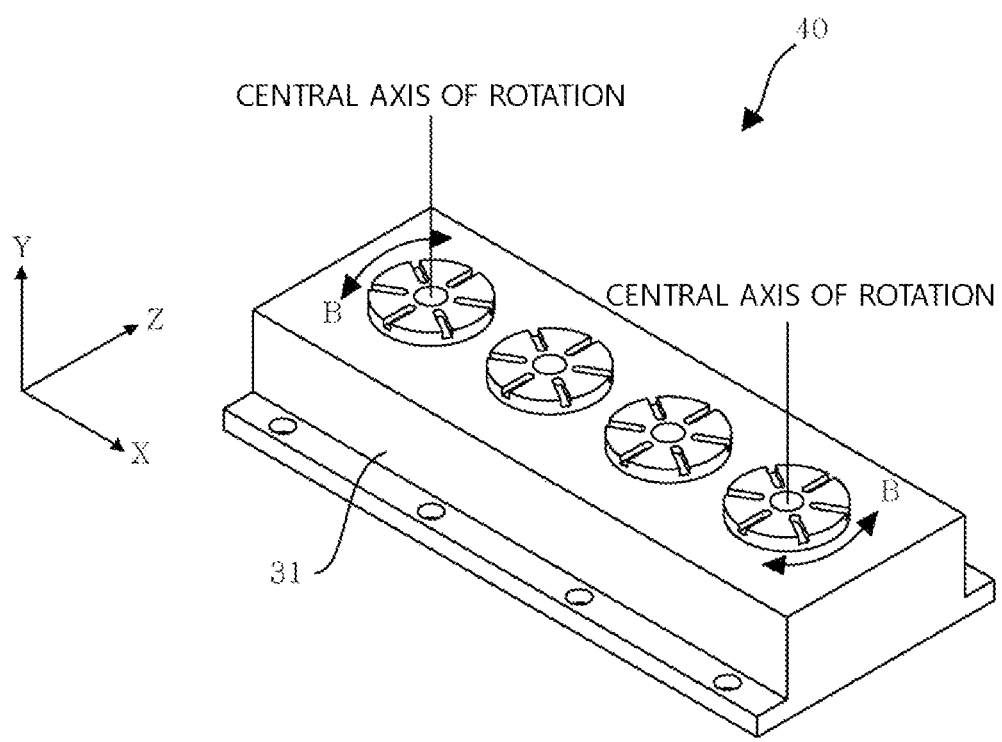

First, the jig shown in FIG. 7 is an auto pallet changer (APC), i.e., an automatic pallet changing device. This jig is a jig using a method in which once a workpiece fastened to one side has been machined, the jig is rotated, a machined product is discharged, and a workpiece is moved to a machining location. The jig shown in FIG. 8 is the B-axis rotary type of jig 31, i.e., an index table or rotary table, and may be rotated around the arrow direction, i.e., an axis parallel to the Y-axis movement direction of the saddle. This type of jig 31 is a type of jig that allows workpieces to be mounted into an opposite jig during the machining of workpieces located in front of the spindles 4. The jig 31 may be rotated around a B axis, and may thus perform the formation of a groove in the lateral direction of a workpiece or the formation of a circular arc in addition to general machining such as general drilling, and tapping.

Figure 9:
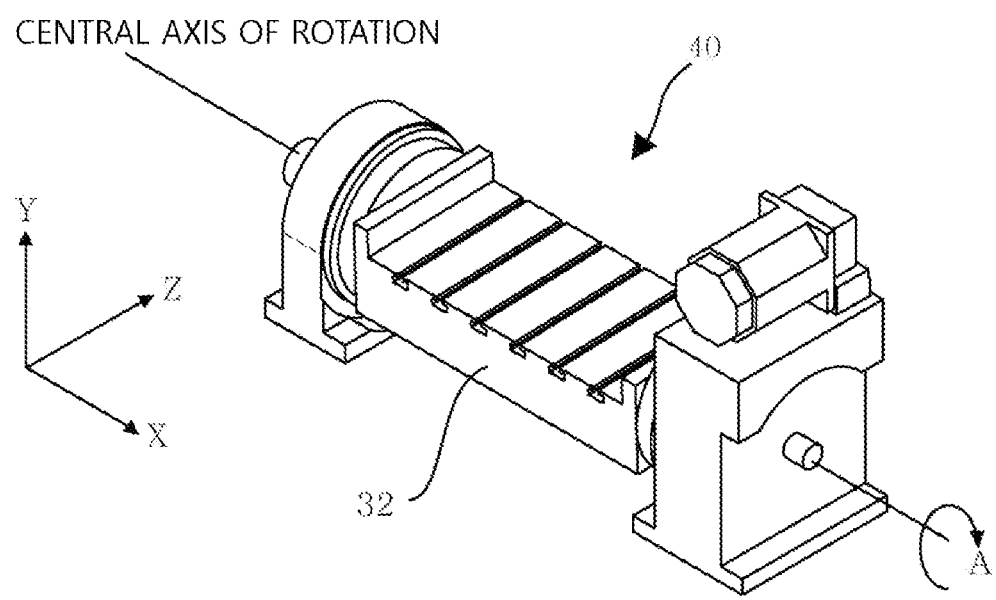

The jig shown in FIG. 9 is an A-axis rotary type of jig 32, i.e., a tilting type of jig, and may be rotated around the arrow direction, i.e., an axis parallel to the X-axis movement direction of the saddle. This type of jig may be rotated around an A axis, and may thus perform the machining of the front, back, top and bottom surfaces of a workpiece in addition to general machining such as general drilling, and tapping.

Figure 10:
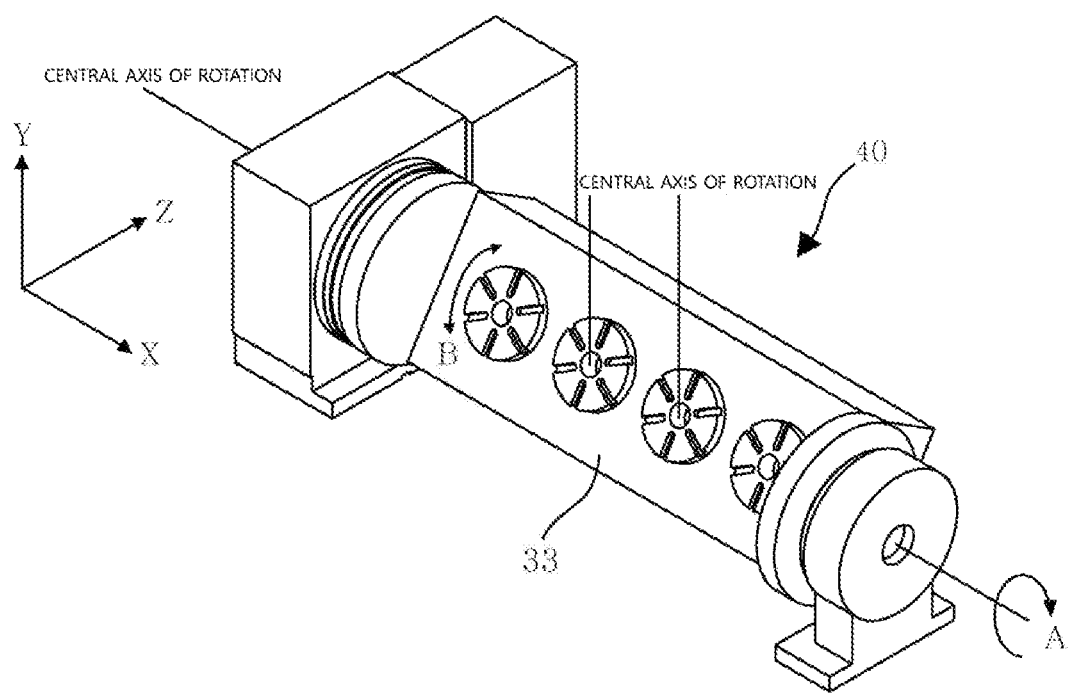

The jig shown in FIG. 10 is a multi-tilting rotary table type jig and the A- and B-axis simultaneous rotary type of jig 33. The jig may be rotated around the arrow direction, i.e., an axis parallel to the X-axis movement direction axis of the saddle (A-axis rotation) or an axis parallel to the Y-axis movement direction axis of the saddle (B-axis rotation). This type of jig may perform various types of machining in addition to the basic machining, which may be performed by the jigs shown in FIGS. 7 to 9, through composite synchronous control.

The reference symbol designates an ATC (Auto Tool Changer) 50, i.e., an automatic tool changing device, and is disposed on one side of the column 2. The ATC 50 is configured to hold the cutting tools 8 to be mounted onto the spindles 4, to put cutting tools used into the empty space of a tool magazine 51 after one-step machining has been performed, and to mount tools to perform next-step machining by rotating the tool magazine 51.

Figure 11:
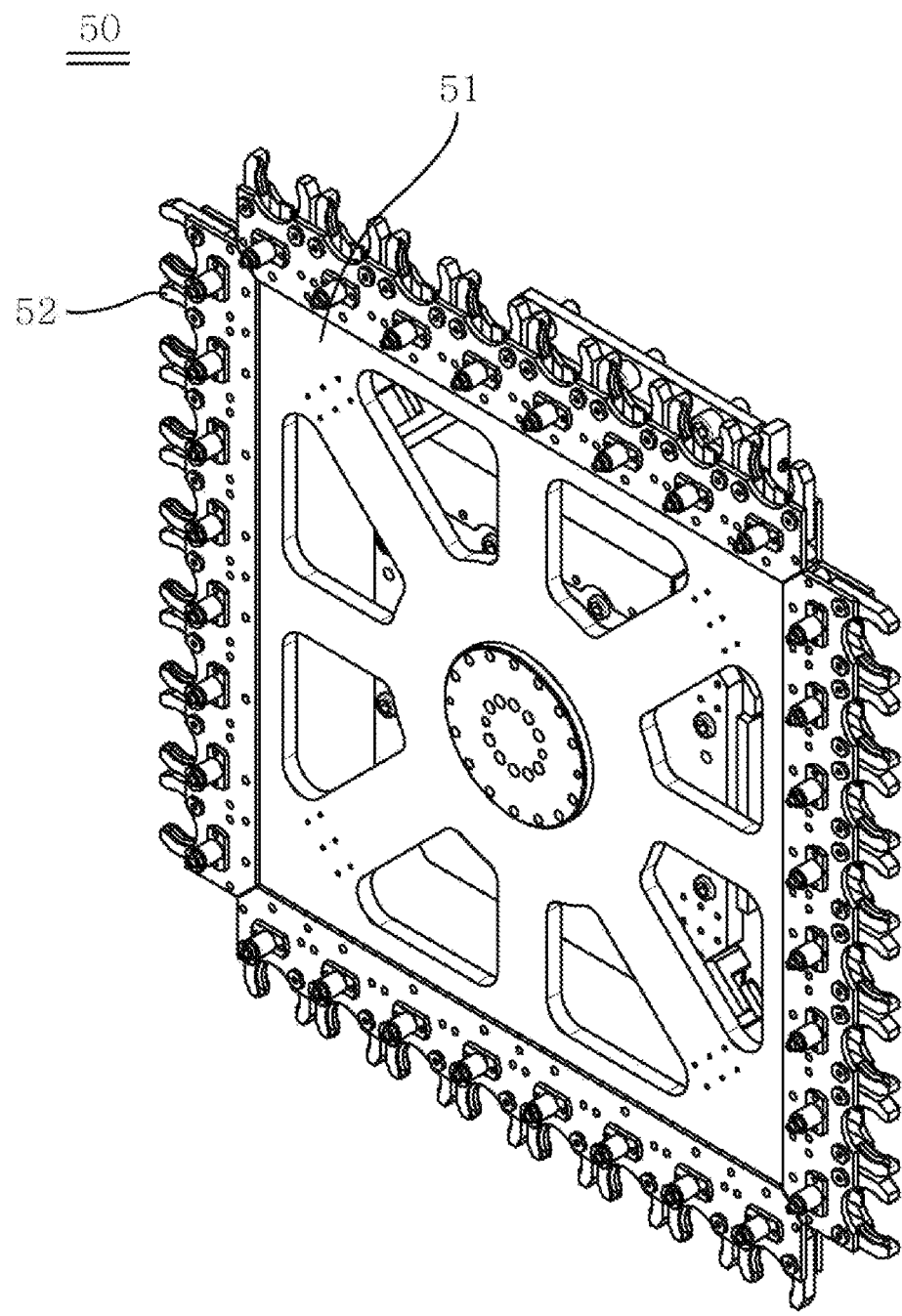
FIGS. 11 to 13 are views showing an example of the configuration of an ATC according to the present invention.
Figure 12:
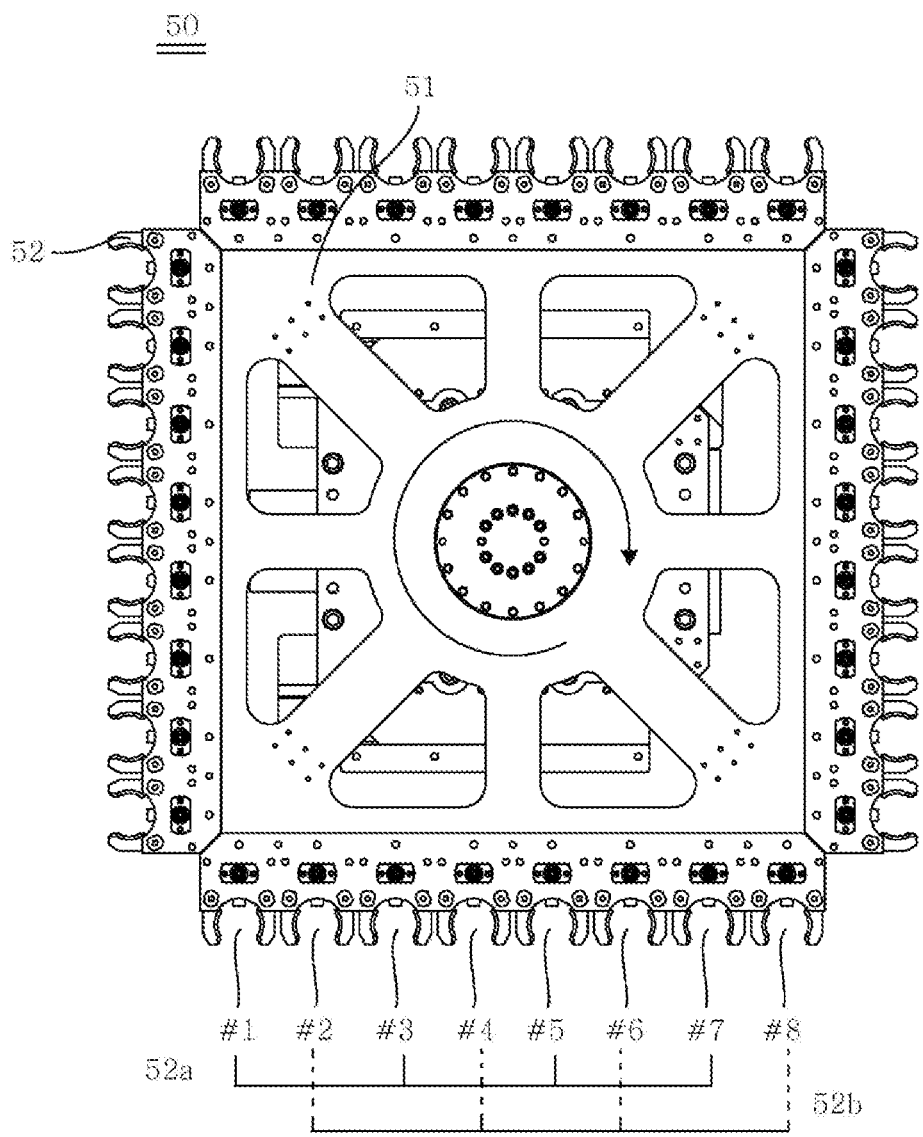
Figure 13:
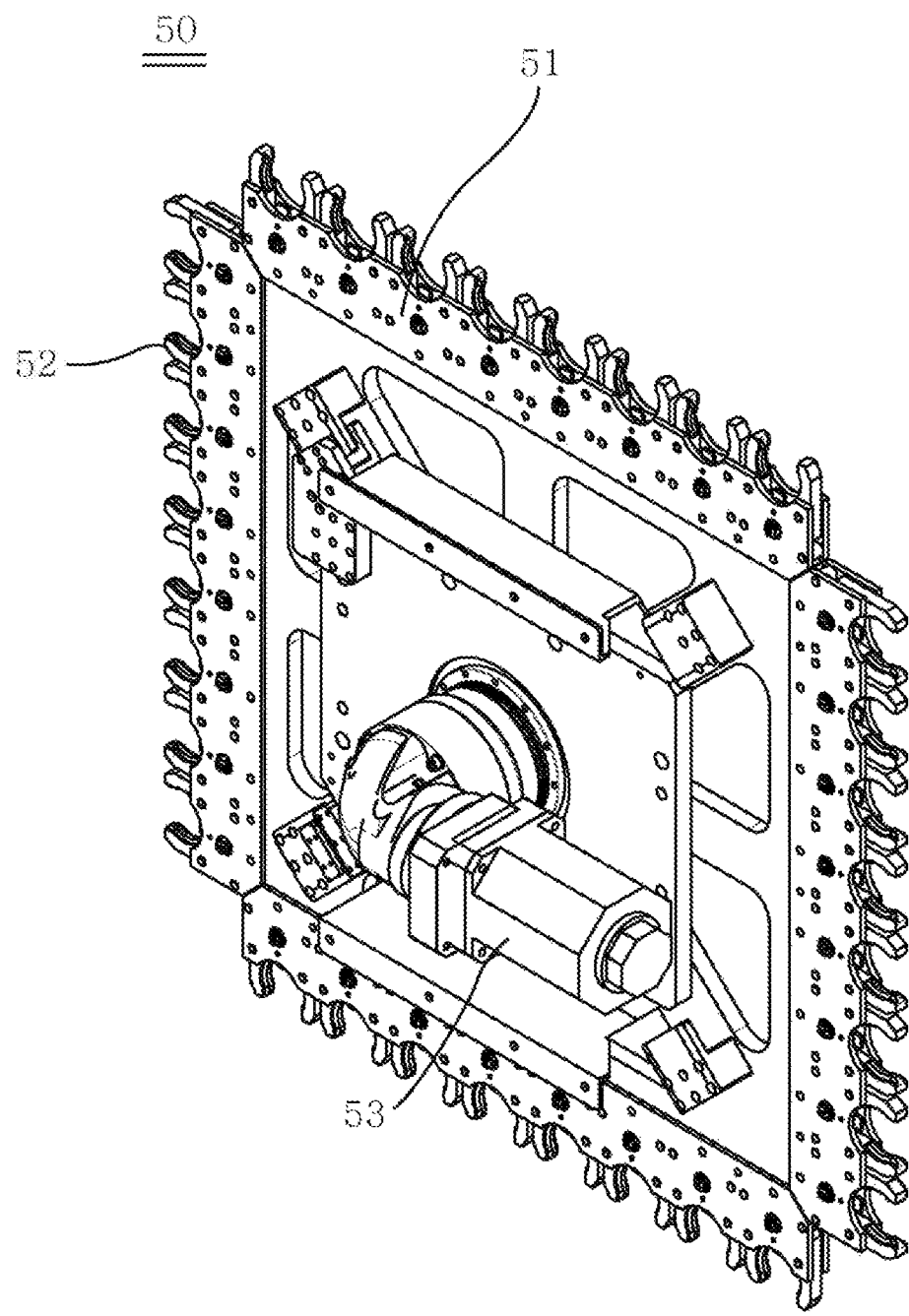

The ATC shown in FIGS. 11 to 13 is a rotary type of ATC in which a total of 32 tool grippers 52 are disposed such that 32 tools can be mounted in the single tool magazine 51. When the spindles are four in number, the ATC may be divided into sectors so that four tools form each sector. In this case, four tool grippers constitute each sector, and thus a total of 8 types of machining may be performed.

In other words, the ATC 50 includes the tool magazine 51, the tool grippers 52 formed in the tool magazine 51 and configured to hold the cutting tools 8 to be mounted onto the spindles 4, and a drive motor 53 configured to rotate the tool magazine 51. A number of tool grippers 52 equal to twice the number of spindles are formed on each side of the tool magazine 51.

That is, eight tool grippers 52 are disposed on each side of the tool magazine 51. Accordingly, assuming that the four spindles perform the same machining, workpieces are machined using cutting tools mounted into four tool grippers 52, the cutting tools used are fitted into empty tool grippers 52, the spindles are moved in the X-axis direction by the distance corresponding to the center line of the tool grippers, cutting tools to be used are mounted, and machining is then performed. As a result, even when the tool magazine is not rotated, two types of machining may be performed, and thus the time required for tool change may be reduced.

As an example, in the case where 16 tools are mounted into the tool magazine and the spindles are four in number, the four spindles perform the same machining. In the case of the conventional tool magazine, i.e., the tool magazine in which four tools are mounted into each side of the tool magazine, the tool magazine has to be rotated to perform tool change after machining has been performed once. Accordingly, the spindles has to wait for the period during which the tool magazine is rotated, and thus there are required a total of four periods during which the tool magazine is rotated. In contrast, in the case where eight tools are mounted into each side of the tool magazine, machining is performed using four tools, and tool change may be performed by slightly moving the location of the spindles by the distance corresponding to the center line of the tool grippers in the X-axis direction. Accordingly, machining may be completed by rotating the tool magazine only twice, and thus the time for which workpieces are not machined may be significantly reduced. If the movement of the spindles in the X-axis direction is limited, a configuration may be made such that a shifting function, i.e., the function of moving the ATC in the X-axis direction by a predetermined distance, is provided to the ATC itself and tool change is performed using the shifting function.

Furthermore, it is natural that as the number of tool grippers of the tool magazine itself increases, a machining range is widened. In some cases, spare tools may be mounted and tool change may be performed using the spare tools after machining has been performed a predetermined number of times, thereby preventing defective products from occurring due to the wear of a cutting tool or damage to a cutting tool.

Next, referring to FIG. 12, the spindles 4 alternately use the cutting tools mounted into the odd-numbered tool grippers 52a and the cutting tools mounted into the even-numbered tool grippers 52b among the cutting tools mounted into the tool grippers 52.

In other words, when the tool grippers 52 mounted on one side of the tool magazine 51 are numbered from 1 to 8 in a rotation direction, drilling is performed using cutting tools, such as drills, mounted into odd-numbered tool grippers #1, #3, #5 and #7 and then tapping is performed using cutting tools, such as taps, mounted into even-numbered tool grippers #2, #4, #6 and #8. Tool change may be performed without rotating the tool magazine 51 with respect to four workpieces, and thus drilling and tapping may be performed. The gap between the tool grippers may be narrowed, which in turn reduces the size of the ATC, thereby reducing material cost and driving power. Furthermore, tool change speed may be increased. Moreover, the number of mountable tools may be increased, and thus various types of machining may be performed on workpieces, thereby improving machining performance.

Figure 14:
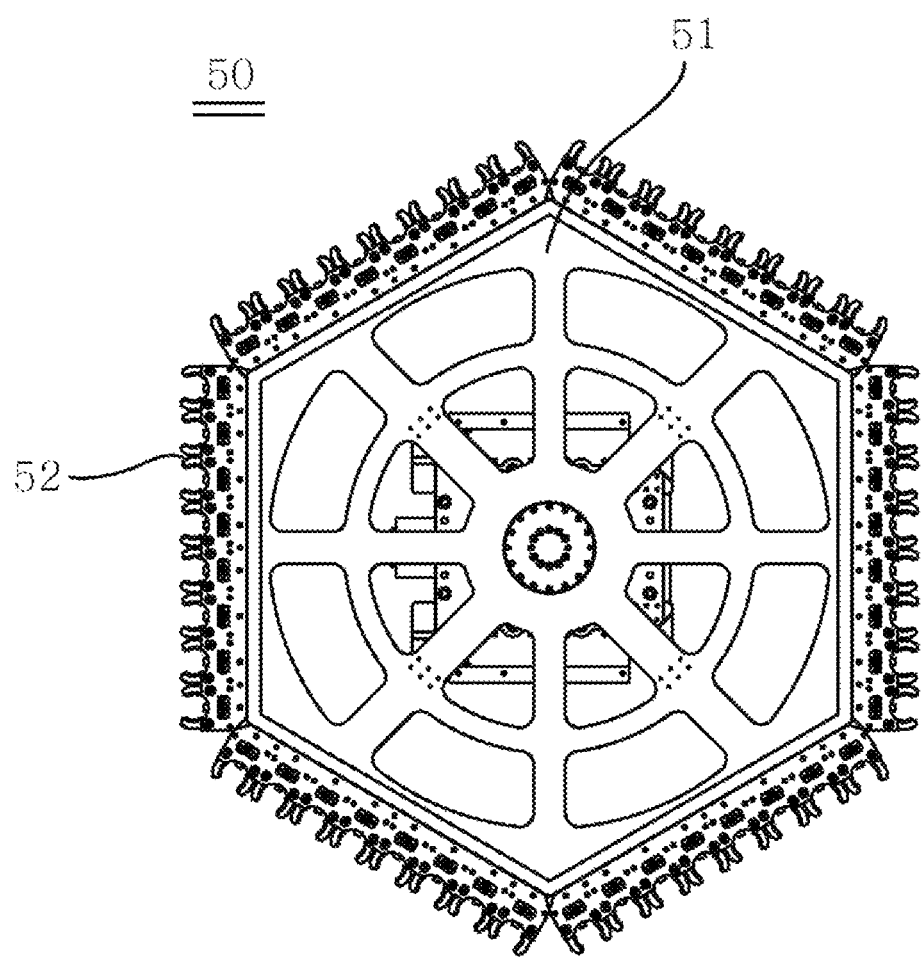
FIGS. 14 and 15 show other embodiments of ATCs according to the present invention.
Figure 15:
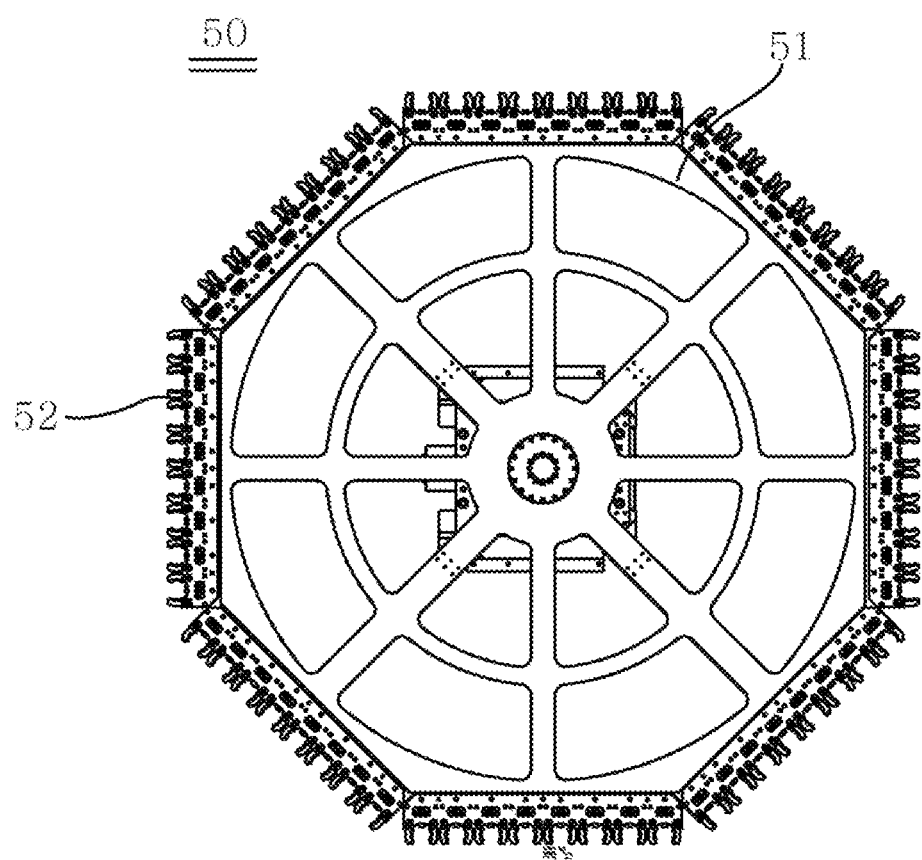

FIGS. 14 and 15 show other embodiments of ATCs according to the present invention, in which the shape of a tool magazine is formed in a hexagonal or octagonal shape other than a rectangular shape and a total of eight tool grippers are disposed on each side of the tool magazine.

In the case of the hexagonal tool magazine shown in FIG. 14, a larger number of tools may be mounted, thereby increasing its versatility. In particular, in the case of four spindles, 12 types of machining may be performed. The octagonal tool magazine shown in FIG. 15 may also be mounted with a larger number of tools than a rectangular tool magazine.

As a result, the horizontal multi-spindle machining center according to the present invention provides: a prominent effect in that the 2- or 3-axis transfer drive units are disposed in the machining center installed to machine workpieces, the ram equipped with the spindles is moved in the up-down, front-back, and/or left-right directions of the workpieces, and synchronous control is performed between the drive units, so that the paths of movement of the spindles are minimized and thus power consumption attributable to the movement of the spindles may be reduced, in that the spindles are configured to include a plurality of spindles, so that a plurality of workpieces may be machined simultaneously, and in that tool change is simultaneously performed for the tools fastened to the plurality of spindles and configured to machine workpieces by using the ATC, so that tool change speed may be improved and thus manufacturing efficiency may be improved; a prominent effect in that a number of tool grippers equal to twice the number of spindles are disposed on each side of the tool magazine of the ATC and thus the number of tools disposed on each side of the tool magazine is made equal to twice the number of spindles, so that two types of machining may be continuously performed without rotating the tool magazine and thus tool change time may be shortened, thereby reducing the time for which the workpieces are not machined, and so that a number of various tools equal to twice the number of tools of the conventional tool magazine may be mounted and thus various types of machining may be flexibly dealt with; and a prominent effect in that the Y-axis drive motors constituting part of the Y-axis drive unit are disposed on both sides of the saddle and the two Y-axis drive motors are synchronously controlled, so that the stable movement of the saddle may be ensured and a high machining load may be withstood, and in that the three types of jigs, i.e., the A-axis rotary type of jig, the B-axis rotary type of jig and the A- and B-axis simultaneous rotary type of jig, are selectively used as the jig disposed in the front side of the machining center and configured to fasten the workpieces depending on workpieces, and thus the applicability of the machining of workpieces is improved.

The invention claimed is:

1. A horizontal multi-spindle machining center for machining workpieces, the horizontal multi-spindle machining center comprising:
    a base configured to be disposed on a support surface;
    a column configured to be disposed over the base and to be moved in a left-right direction of the workpieces by an X-axis drive unit;
    a ram configured to be disposed in the column and to support spindles into which cutting tools are mounted;
    a Y-axis drive unit configured to move, in an up-down direction, a saddle supporting the ram;
    a Z-axis drive unit configured to move the ram in a front-back direction of the workpieces;
    servomotors configured to rotate the spindles; and
    a jig configured to be disposed in front of the spindles and to fasten the workpieces;
    wherein an auto tool changer (ATC), configured to exchange the cutting tools mounted to the spindles, is disposed above the spindles;
    wherein guide rails of the X-axis drive unit are fastened to the base on a top of the base,
    wherein the column is moved along the guide rails,
    wherein the Y-axis drive unit is disposed on one side of the column,
    wherein the ram is equipped with four of the spindles and is disposed in the column,
    wherein transfer of the ram in a Z-axis direction is supported by the saddle,
    wherein the column, the ram and the saddle are moved in the left-right direction of the workpieces by the X-axis drive unit, the ram is moved in the front-back direction of the workpieces by the Z-axis drive unit, and the ram and the saddle are moved in an up-down direction of the workpieces by the Y-axis drive unit; and
    wherein the Y-axis drive unit moves the saddle along guide rails fastened to the column, two Y-axis drive motors of the Y-axis drive unit are disposed on opposite sides of the saddle, the two Y-axis drive motors are synchronously controlled, and the two Y-axis drive motors measure loads applied to the respective drive motors, compare the measured loads with each other, and stop operation of the machining center when a difference between the load of one of the drive motors and the load of the other drive motor exceeds a set range.

2. The horizontal multi-spindle machining center of claim 1,
    wherein the ATC comprises:
        a tool magazine,
        tool grippers formed in the tool magazine and configured to hold cutting tools to be mounted onto the spindles, and
        a drive motor configured to rotate the tool magazine, and
    wherein the tool grippers are configured so that a number of tool grippers equal to twice a number of the spindles are formed on each side of the tool magazine.

3. The horizontal multi-spindle machining center of claim 2,
    wherein the four spindles are configured to be capable of alternately using cutting tools mounted into odd-numbered ones of the tool grippers and cutting tools mounted into even-numbered ones of the tool grippers among the cutting tools mounted into the tool grippers.

4. The horizontal multi-spindle machining center of claim 1, wherein:
    the spindles perform machining of the workpiece while being rotated by the servomotors, and each of the servomotors drives two of the spindles so that two servomotors configured to rotate a total of four spindles are provided in the machining center; and
    the two servomotors measure loads applied to the respective servomotors, compare the measured loads with each other, and stop operation of the machining center when a difference between the load of one of the servomotors and the load of the other servomotor exceeds a set range.

5. The horizontal multi-spindle machining center of claim 1, wherein:
    the spindles perform machining of the workpiece while being rotated by the servomotors, and each of the servomotors drives a corresponding one of the spindles so that four servomotors configured to rotate a total of four spindles are provided in the machining center; and
    the four servomotors measure loads applied to the respective servomotors, compare the measured loads with each other, and stop operation of the machining center when a difference between the load of one of the servomotors and the load of another servomotor exceeds a set range.

* * * * *